(12) United States Patent
Huiqiang et al.

(10) Patent No.: US 10,689,291 B2
(45) Date of Patent: Jun. 23, 2020

(54) GLASS SURFACE PATTERN PRINTING PROCESS

(71) Applicant: Guangdong Shone Lighting Co., Ltd., Guangdong (CN)

(72) Inventors: Zhang Huiqiang, Guangdong (CN); Zeng Zhiming, Guangdong (CN)

(73) Assignee: Guangdong Shone Lighting Co., Ltd., Guangdong (CN)

( * ) Notice: Subject to any disclaimer, the term of this patent is extended or adjusted under 35 U.S.C. 154(b) by 206 days.

(21) Appl. No.: 15/882,707

(22) Filed: Jan. 29, 2018

(65) Prior Publication Data
US 2018/0339940 A1    Nov. 29, 2018

(30) Foreign Application Priority Data
May 26, 2017    (CN) .......................... 2017 1 0387018

(51) Int. Cl.
| | |
|---|---|
| *C03C 23/00* | (2006.01) |
| *C03C 17/22* | (2006.01) |
| *C03B 27/012* | (2006.01) |
| *C03C 17/34* | (2006.01) |
| *C03B 32/00* | (2006.01) |

(52) U.S. Cl.
CPC .......... *C03C 23/007* (2013.01); *C03B 27/012* (2013.01); *C03C 17/22* (2013.01); *C03C 17/3411* (2013.01); *C03B 32/00* (2013.01); *C03C 2217/72* (2013.01); *C03C 2218/119* (2013.01); *C03C 2218/32* (2013.01)

(58) Field of Classification Search
CPC ... C03C 23/007; C03C 17/22; C03C 2217/72; C03C 2218/32; C03B 27/012
See application file for complete search history.

(56) References Cited

U.S. PATENT DOCUMENTS

| | | | |
|---|---|---|---|
| 2008/0063876 A1* | 3/2008 | Sakoske | C03C 8/04 428/432 |
| 2008/0264931 A1* | 10/2008 | Vilato | C03C 17/00 219/622 |
| 2017/0044656 A1 | 2/2017 | Chahboune et al. | |

FOREIGN PATENT DOCUMENTS

WO    2006004409 A2    1/2006

OTHER PUBLICATIONS

Extended European Search Report, 18169991.9, dated Oct. 1, 2018, 7 pages, European Patent Office.

* cited by examiner

*Primary Examiner* — Queenie S Dehghan
(74) *Attorney, Agent, or Firm* — Kirby Drake

(57) ABSTRACT

A glass pattern printing process may print a pattern on a front side of a glass. The glass pattern printing process may produce the pattern in a wear-resistant, acid-resistant, alkali-resistant and well-transparent form. The glass pattern printing process may be ideal for producing light-emitting tiles.

6 Claims, 1 Drawing Sheet

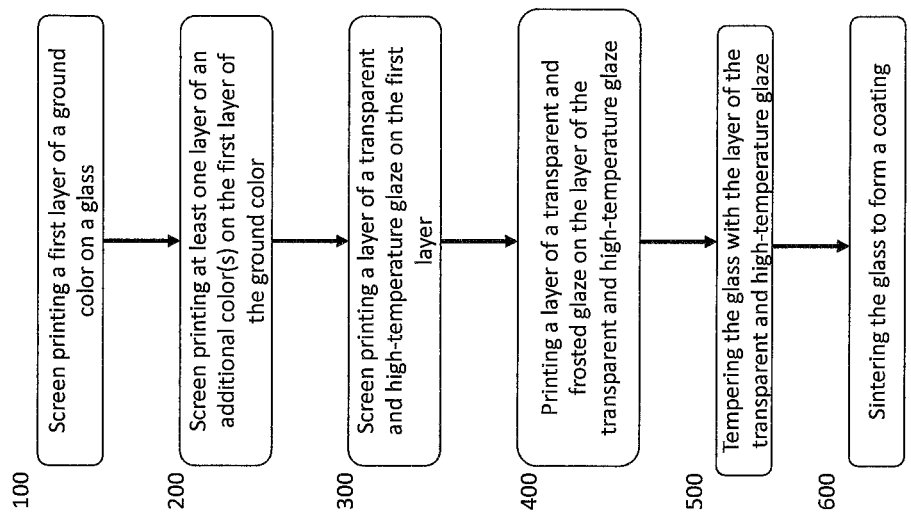

GLASS SURFACE PATTERN PRINTING PROCESS

CROSS REFERENCE TO RELATED APPLICATION

The present application hereby claims priority to Chinese Patent Application No. 2017103870185, filed May 26, 2017, entitled "A GLASS SURFACE PATTERN PRINTING PROCESS" which is incorporated herein by reference in its entirety.

TECHNICAL FIELD

This disclosure relates generally to technology for printing patterns on glass, and more specifically, to a glass pattern printing process.

BACKGROUND

Glass screen printing refers to using screen plates and glass glaze for decorative printing on glassware. Currently, glass screen printing can be provided on the back side of glass, but the screen-printed pattern may not be vivid, and hues may not be rich. Additionally, glass and glass materials including printed patterns can provide unidentifiable printed patterns. Further, current glass screen printing can produce unsecured pattern layers and can be susceptible to wear. Using current glass screen printing processes, some printed patterns can be non-transparent. Existing printed patterns on the glass may not have a raised and sunken three-dimensional effect, and non-skid properties may be poor when current glass screen printing processes are employed. Therefore, poor abrasive resistance and non-transparency can make existing printed patterns on glass unable to meet the requirements for producing light-emitting tiles.

SUMMARY

Embodiments of the present disclosure may provide a process of printing one or more patterns on the front side of glass that may ensure that the one or more patterns are wear-resistant, acid-resistant, alkali-resistant and well-transparent.

Embodiments of the present disclosure may provide a glass pattern printing process that may include the step of screen printing a first layer of a ground color on a front side of a glass. The ground color may provide patterns and hues, and the ground color may be semi-transparent and enrich the patterns and the hues. The glass pattern printing process may further include the step of screen printing at least one layer of an additional color on the first layer of the ground color. The glass pattern printing process may include the step of screen printing a layer of a transparent and high-temperature glaze on the first layer, and the first layer may include the additional color. The glass pattern printing process may also provide the step of printing a layer of a transparent and frosted glaze that may include raised and sunken three-dimensional grains on the layer of the transparent and high-temperature glaze. The glass pattern printing process may provide the step of tempering the glass with the layer of the transparent and high-temperature glaze, and the layer of the transparent and high-temperature glaze may be screen-printed in a tempering furnace. The glass pattern printing process may provide the step of sintering the glass to form a compact coating. Screen printing the at least one layer of the additional color on the first layer of the ground color may provide overprinting. The at least one layer of the additional color and the ground color may be combined according to the hues of the ground color and additional hues for each of the at least one layer of the additional color. The raised grains may be specially manufactured marble or wood grains and may have a dark color. Sunken grains may be shallow. Glass may be tempered by utilizing approximately four to six layers of the transparent and high-temperature glaze. The glass may be sintered at a temperature that may be between approximately six hundred to seven hundred degrees Celsius. Two layers of color may be screen-printed on the first layer of the ground color. The transparent and high-temperature ground glaze may be made of inorganic materials. The frosted glaze may be made of inorganic materials.

Other embodiments of the present disclosure may provide a glass pattern printing process that may consist of a plurality of steps including the step of screen printing a first layer of a ground color on a front side of a glass. The ground color may provide patterns and hues, and the ground color may be semi-transparent and enrich the patterns and the hues. The glass pattern printing process may further include the step of screen printing one or more layers of at least one additional color on the first layer of the ground color. The glass pattern printing process may include the step of screen printing a layer of a transparent and high-temperature glaze on the first layer, and the first layer may include the at least one additional color. The glass pattern printing process may also provide the step of printing a layer of a transparent and frosted glaze that may include raised and sunken three-dimensional grains on the layer of the transparent and high-temperature glaze. The glass pattern printing process may provide the step of tempering the glass with the layer of the transparent and high-temperature glaze, and the layer of the transparent and high-temperature glaze may be screen-printed in a tempering furnace. The glass pattern printing process may provide the step of sintering the glass to form a compact coating.

BRIEF DESCRIPTION OF THE DRAWING

For a more complete understanding of this disclosure and its features, reference is now made to the following description, taken in conjunction with the accompanying drawing, in which:

FIGURE depicts a glass pattern printing process according to an embodiment of the present disclosure.

DETAILED DESCRIPTION

The present disclosure generally provides a glass pattern printing process. In particular, the present disclosure provides a glass printing pattern process that produces a plurality of layers of high-temperature glazes.

As shown in the FIGURE, glass pattern printing process may provide screen printing a first layer of a ground color on the front side of a glass in first step 100 in embodiments of the present disclosure. The ground color may be determined according to patterns and hues, may be semi-transparent, and may bring out, reveal, or depict an entire pattern of hues. The glass pattern printing process may provide second step 200 of screen printing one or more additional layers of color on the first layer of ground color. The at least one additional layer may be subject to overprinting. It should be appreciated that screen printing on more or less than the one or more additional layers may be performed without departing from the present disclosure. It should be appreciated that overprinting may be determined by pattern layering, and a color that may be provided on the one or more additional layers may be combined according to the hues of the one or more additional layers. Alternatively, a digital inkjet printer may spray a high-temperature glaze on a bottom-spraying layer and may obtain the hues and the patterns or hues and patterns similar to those obtained by overprinting. The glass printing process may provide third step 300 of screen printing another layer of transparent, high-temperature, ground glaze that may be specially manufactured on top layer of the one or more additional layers and may ensure a frosted and rough texture of a glass surface.

The FIGURE depicts that the glass printing process may provide fourth step 400 of printing a layer of transparent and frosted glaze that may include raised grains that may be specially manufactured on the high-temperature, ground glaze layer. Raised grains may be specially manufactured according to marble or wood grains. It should be appreciated that dark grains may be raised, and shallow grains may be sunken to ensure that the glass surface includes raised and sunken three-dimensional grains.

As depicted in the FIGURE, the glass printing process may further provide fifth step 500 of tempering the glass with additional layers, such as a fifth and a sixth layer, of high-temperature glazes that may be screen-printed in a tempering furnace. It should be appreciated that tempering the glass may be performed with more or less than two additional layers of high-temperature glazes without departing from the present disclosure.

Embodiments of the present disclosure may provide sintering glass 600, as depicted in the FIGURE, at a temperature in the range of approximately six hundred to seven hundred degrees Celsius and may make a plurality of layers of high-temperature glazes that may form a compact coating. The compact coating may have a raised and sunken three-dimensional effect and may be anti-ultraviolet (UV), acid-resistant and alkali-resistant in embodiments of the present disclosure. It should be appreciated that additional layers of the high-temperature, ground glaze and additional layers of the frosted glaze may be applied to the glass substrate or components thereof and may be made of inorganic materials that may provide reinforcement and may increase stability of the glass substrate or components thereof.

Embodiments of the present disclosure may provide a glass pattern printing process that may utilize more than five working procedures to screen-print patterns on a surface of glass. It should be appreciated that more or less than five working procedures may be utilized without departing from the present disclosure. It should be appreciated that patterns may be vivid, hues may be rich, and a raised and sunken three-dimensional effect may be realized. It should be appreciated that the material that the glass is made of may not be identified from a front side of the glass in embodiments of the present disclosure. It should also be appreciated that a texture of the glass may be strong, and the patterns in the glass may be wear-resistant, acid-resistant, alkali-resistant and transparent in embodiments of the present disclosure. It should be appreciated that the high-temperature ground glaze and a frosted glaze may ensure that the glass provides the vivid patterns, the rich hues, and the raised and sunken three-dimensional effect. It should also be appreciated that the high-temperature ground glaze and the frosted glaze may ensure that the texture of the glass is strong and that the patterns in the glass may be wear-resistant, acid-resistant, alkali-resistant and transparent. It should further be appreciated that the high-temperature ground glaze and the frosted glaze may provide better performance and effects compared to conventional methods of printing on glass. It should be appreciated that the high-temperature ground glaze and the frosted glaze may protect the glaze coating and enhance an anti-fouling performance, the wear-resistance, the acid-resistance, and the alkali-resistance. The glass including the patterns printed on the glass may be wear-resistant, acid-resistant, alkali-resistant, skid-resistant, transparent, and suitable for light-emitting tiles.

It should be appreciated that overprinting may refer to overlapping registration of graphic printing of various mattes during multi-color printing, i.e., performing the color separation of a manuscript to obtain monochromatic printing plates of different screen angles, overlapping registering of plates according to a printing plate color sequence, and finally obtaining the prints with the same levels and hues of the manuscript.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A glass pattern printing process comprising:
    screen printing a first layer of a ground color on a front side of a glass, wherein the ground color is selected according to a pattern and hue, and wherein the ground color is semi-transparent;
    screen-printing at least one layer of an additional color on the first layer of the ground color;
    screen-printing a layer of a transparent and high-temperature glaze on the first layer containing the at least one layer of the additional color after the at least one layer of the additional color has been screen-printed on the first layer of the ground color;
    printing a layer of a frosted glaze including raised specially manufactured marble or wood grains and sunken shallow grains on the layer of the transparent and high-temperature glaze;
    applying one or more additional layers of high-temperature glaze and screen-printing in a tempering furnace; and
    sintering the glass to form a compact coating.

2. The glass pattern printing process according to claim 1, wherein the raised specially manufactured marble or wood grains have a dark color.

3. The glass pattern printing process according to claim 1, wherein the glass is sintered at a temperature between approximately six hundred to seven hundred degrees Celsius.

4. The glass pattern printing process according to claim 1, wherein two layers of color are screen-printed on the first layer of the ground color.

5. The glass pattern printing process according to claim 1, wherein the transparent and high-temperature ground glaze is made of inorganic materials.

6. The glass pattern printing process according to claim 1, wherein the frosted glaze is made of inorganic materials.

\* \* \* \* \*